(12) United States Patent
LeBlanc et al.

(10) Patent No.: US 8,515,234 B2
(45) Date of Patent: Aug. 20, 2013

(54) METHODS, SYSTEMS AND DEVICES FOR PROVIDING FIBER-TO-THE-DESKTOP

(75) Inventors: Thomas G. LeBlanc, Westminster, MA (US); Trevor D. Smith, Eden Prairie, MN (US); Thomas Marcouiller, Shakopee, MN (US); Ronald J. Kleckowski, Manchester Center, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 338 days.

(21) Appl. No.: 12/953,781

(22) Filed: Nov. 24, 2010

(65) Prior Publication Data

US 2011/0158598 A1 Jun. 30, 2011

Related U.S. Application Data

(60) Provisional application No. 61/264,474, filed on Nov. 25, 2009.

(51) Int. Cl.
*G02B 6/36* (2006.01)

(52) U.S. Cl.
USPC .......................................... 385/135; 385/100

(58) Field of Classification Search
None
See application file for complete search history.

(56) References Cited

U.S. PATENT DOCUMENTS

| | | | |
|---|---|---|---|
| 5,317,663 A | 5/1994 | Beard et al. | |
| 6,457,874 B1 | 10/2002 | Clapp, Jr. et al. | |
| 7,349,616 B1 | 3/2008 | Castonguay et al. | |
| 7,409,138 B1 | 8/2008 | Frazier et al. | |
| 7,418,181 B2 | 8/2008 | Zimmel et al. | |
| 7,548,680 B2 | 6/2009 | Castonguay et al. | |
| 7,751,672 B2 | 7/2010 | Smith et al. | |
| 7,869,682 B2 | 1/2011 | Kowalczyk et al. | |
| 2008/0069511 A1 | 3/2008 | Blackwell, Jr. et al. | |
| 2008/0080826 A1 | 4/2008 | Leon et al. | |
| 2008/0170824 A1* | 7/2008 | Hendrickson et al. | 385/53 |
| 2008/0292261 A1 | 11/2008 | Kowalczyk et al. | |
| 2009/0074370 A1 | 3/2009 | Kowalczyk et al. | |

(Continued)

OTHER PUBLICATIONS

International Search Report and Written Opinion mailed Jun. 20, 2011.

(Continued)

*Primary Examiner* — Mike Stahl
(74) *Attorney, Agent, or Firm* — Merchant & Gould P.C.

(57) ABSTRACT

The present disclosure relates to a fiber optic network including a fiber distribution hub having a cabinet, an optical splitter within the cabinet, a hub termination region within the cabinet, a signal input location and an output cable connection location. The fiber optic network also includes a fiber distribution terminal including a terminal housing, a terminal termination region and a terminal spool. The fiber optic network further includes a wall box having a wall box enclosure, a fiber optic adapter positioned at the wall box enclosure and a wall box spool. A first fiber optic cable is wrapped around the terminal spool. The first fiber optic cable interconnects the fiber distribution terminal to the output cable connection location of the fiber distribution hub. The terminal spool rotates about a first axis to allow the first fiber optic cable to be dispensed from the terminal spool. A second fiber optic cable is wrapped around the wall box spool. The second fiber optic cable is optically connected to the fiber distribution terminal. The wall box spool rotates about a second axis to allow the second fiber optic cable to be dispensed from the wall box spool.

15 Claims, 11 Drawing Sheets

(56) References Cited

U.S. PATENT DOCUMENTS

| | | | |
|---|---|---|---|
| 2009/0294016 A1* | 12/2009 | Sayres et al. | 156/71 |
| 2009/0317047 A1* | 12/2009 | Smith et al. | 385/135 |
| 2010/0166376 A1* | 7/2010 | Nair et al. | 385/135 |
| 2011/0030190 A1* | 2/2011 | Larson et al. | 29/428 |
| 2011/0044599 A1 | 2/2011 | Kowalczyk et al. | |
| 2011/0103761 A1* | 5/2011 | LeBlanc et al. | 385/135 |
| 2012/0093473 A1* | 4/2012 | Cox et al. | 385/135 |

OTHER PUBLICATIONS

Shepard, "Characteristics of Switches and Routers," Juniper Networks, (2006), pp. 1-22.
http://www.iec.org/online/tutorials/tdma/index.asp, Time Division Multiple Access (TDMA), International Engineering Consortium, (printed Apr. 7, 2009).
http://www.imcnetworks.com/FTTD.cfm, Fiber to the Desk Solutions by IMC Networks (2009).
"Verizon FiOS Tech Heading to Enterprises" (May 30, 2008), 5 pp.
"TrueNet® Fiber Plug-and-Play Solutions for Data Center Applications Engineered for Uptime ™" ADC (2008).
"Media Conversion—Myths about Media Converters," ADC (2004).
http://en.wikipedia.org/wiki/Passive_optical_network, Passive Optical Network (printed Apr. 6, 2009).
Sharma, "Brain Power— Fiber-to-the-Desk Cabling Paves the Way for a Data Explosion in Medical Imaging," Fiber Optics (2001).
http://www.doc.ic.ac.uk/~nd/surprise_97/journal/vol4/sm27/war.html, "3. The War between Copper and Fibre Optics: Fiber-To-The-Desk," (printed Mar. 13, 2009).
Mathas, "Breaking fiber-to-the-desk barriers," Premises Networks, (2002).
White Papers—"Two-Inch Cable Bend Radius: A New Standard for Wire and Cable Management Systems," (2009).
Pearson, "Fiber is Magic: It makes Wiring Closets Disappear!" The Fiber Optic Association—Tech Topics, (2002).
"Crossroads—Opts for a Fiber-to-the-Desk Solution," Siemon, (2009).
http://www.alliedtelesyn.com/solutions/diagram.aspx?29, "Fiber to the Desk" Allied Telesis (2009).
Stagg et al. "FTTD (Fiber to the Desk)" Lafayette Pro Fiber (2008).
http://www.alibaba.com/product-gs/201158613/Fiber_to_the_Desk_Solution$_{13}$ FTTD/sho . . . "FTTH Triple Play Acess Solution," Alibaba.com, (printed Mar. 13, 2009).
"OmniReach® FTTX Solutions—MDU Rapid Fiber System" ADC (2009).
http://lw.pennnet.com/articles/article_display.cfm?article_id=33907 "Ethernet Interoperability brings fiber to the desk," Total Assessment of Next-Gen Networks (printed Mar. 13, 2009).

* cited by examiner

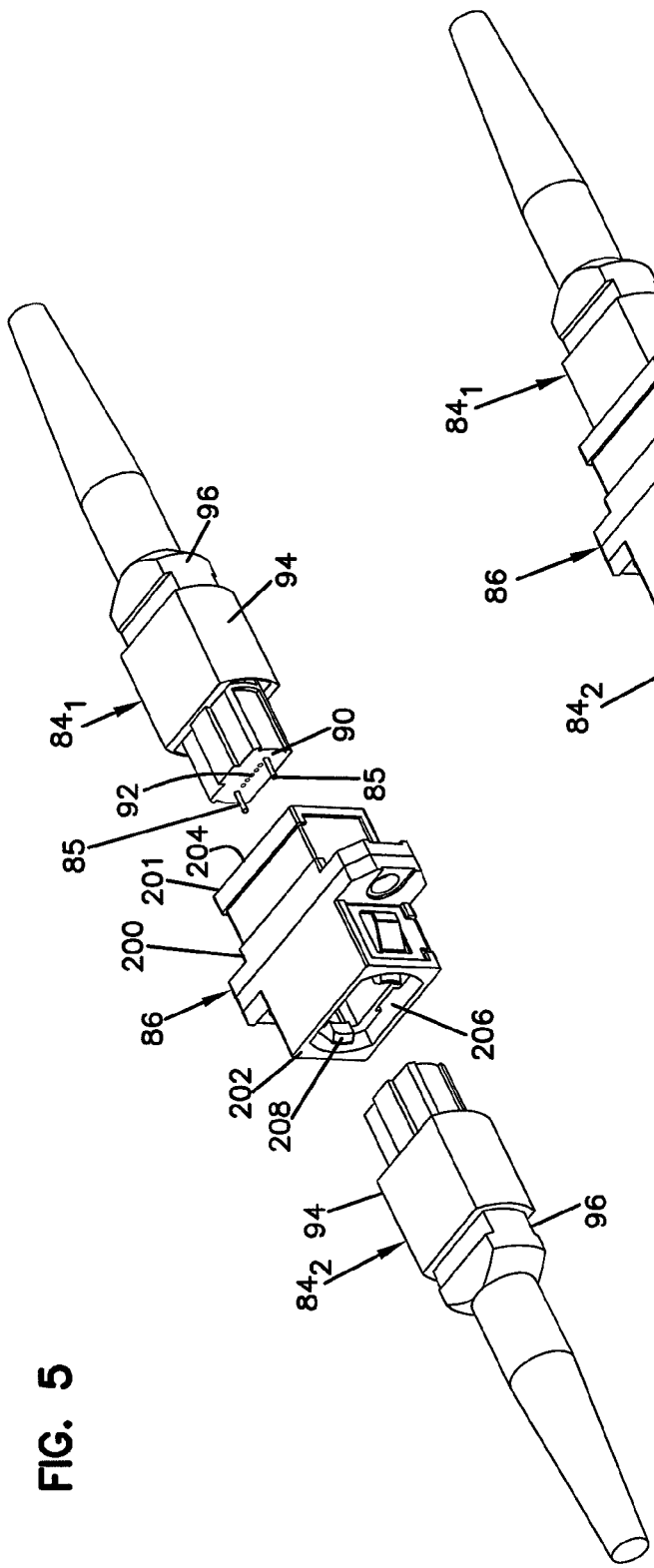
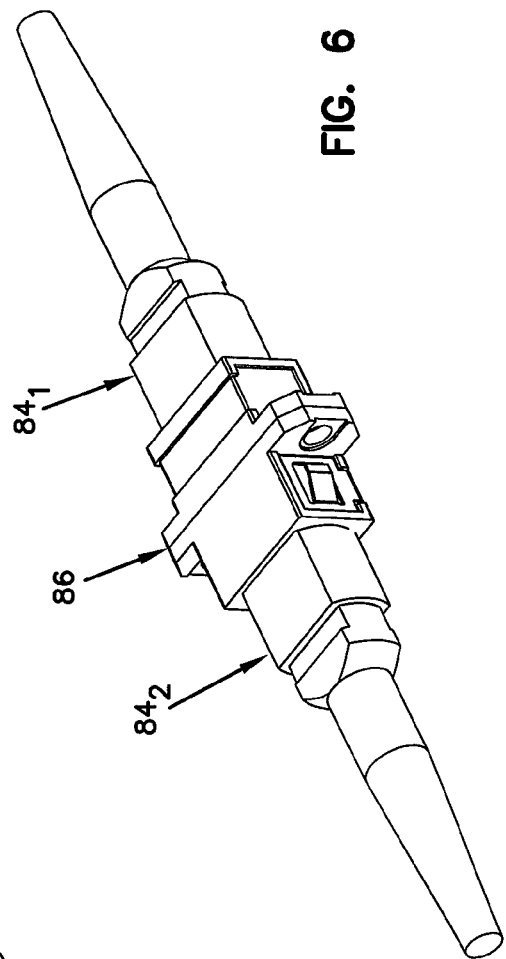
FIG. 5
FIG. 6

METHODS, SYSTEMS AND DEVICES FOR PROVIDING FIBER-TO-THE-DESKTOP

CROSS-REFERENCE TO RELATED APPLICATION

This application claims the benefit of U.S. Provisional Patent Application Ser. No. 61/264,474, filed Nov. 25, 2009, which application is hereby incorporated by reference in its entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC use fiber optic cables that are run from a service provider's central office (e.g., a remote data center) to a cabinet serving a neighborhood. Subscribers connect to the cabinet using traditional copper cable technologies such as coaxial cable or twisted pair wiring. The difference between an FTTN network and an FTTC network relates to the area served by the cabinet. Typically, FTTC networks have cabinets closer to the subscribers and serve a smaller subscriber area than the cabinets of FTTN networks.

In an FTTP network, fiber optic cables are run from a service provider's data center (e.g., a central office) all the way to the subscriber's premises. Example FTTP networks include fiber-to-the-home (FTTH) networks, fiber-to-the-building (FTTB) networks and fiber-to-the-desktop (FTTD) networks. In an FTTB network, optical fiber is routed from the data center over an optical distribution network to an optical network terminal (ONT) located at a building. The ONT typically includes active components that convert optical signals into electrical signals in one direction and that convert electrical signals into optical signals in the opposite direction. The electrical signals are typically routed from the ONT to the subscriber's residence or office space using traditional copper cable technology. In an FTTH network, fiber optic cable is run from the service provider's data center to an ONT located at the subscriber's residence or office space. Once again, at the ONT, optical signals are typically converted into electrical signals for use with the subscriber's devices. In an FTTD network, fiber optic cable is run from the service provider's data center to ONTs located at desktops within subscriber's residences or within office space. Again, at the ONT, optical signals are typically converted into electrical signals for use with the devices provided on the desktops. However, to the extent that an end user may have devices that are compatible with optical signals (e.g., computers equipped with optical-to-electrical line cards), the optical lines may be routed directly to the devices on the desktops without requiring the use of an intermediate ONT for converting the optical signals to electrical signals.

SUMMARY

Features of the present disclosure relate to methods, systems and devices for providing fiber-to-the-premises and fiber-to-the-desktop. In certain embodiments, rotatable fiber deployment spools are incorporated into multiple components that cooperate to form a FTTD network.

These and other features and advantages will be apparent from reading the following detailed description and reviewing the associated drawings. It is to be understood that both the foregoing general description and the following detailed description are explanatory only and are not restrictive of the broad aspects of the disclosure.

BRIEF DESCRIPTION OF THE DRAWINGS

FIG. 5 is a perspective view showing multi-fiber connectors and an adapter for receiving such multi-fiber connectors, the multi-fiber connectors are shown in alignment with the adapter;

FIG. 6 shows the multi-fiber connectors of FIG. 5 inserted within the adapter of FIG. 5;

DETAILED DESCRIPTION

Figure 1:
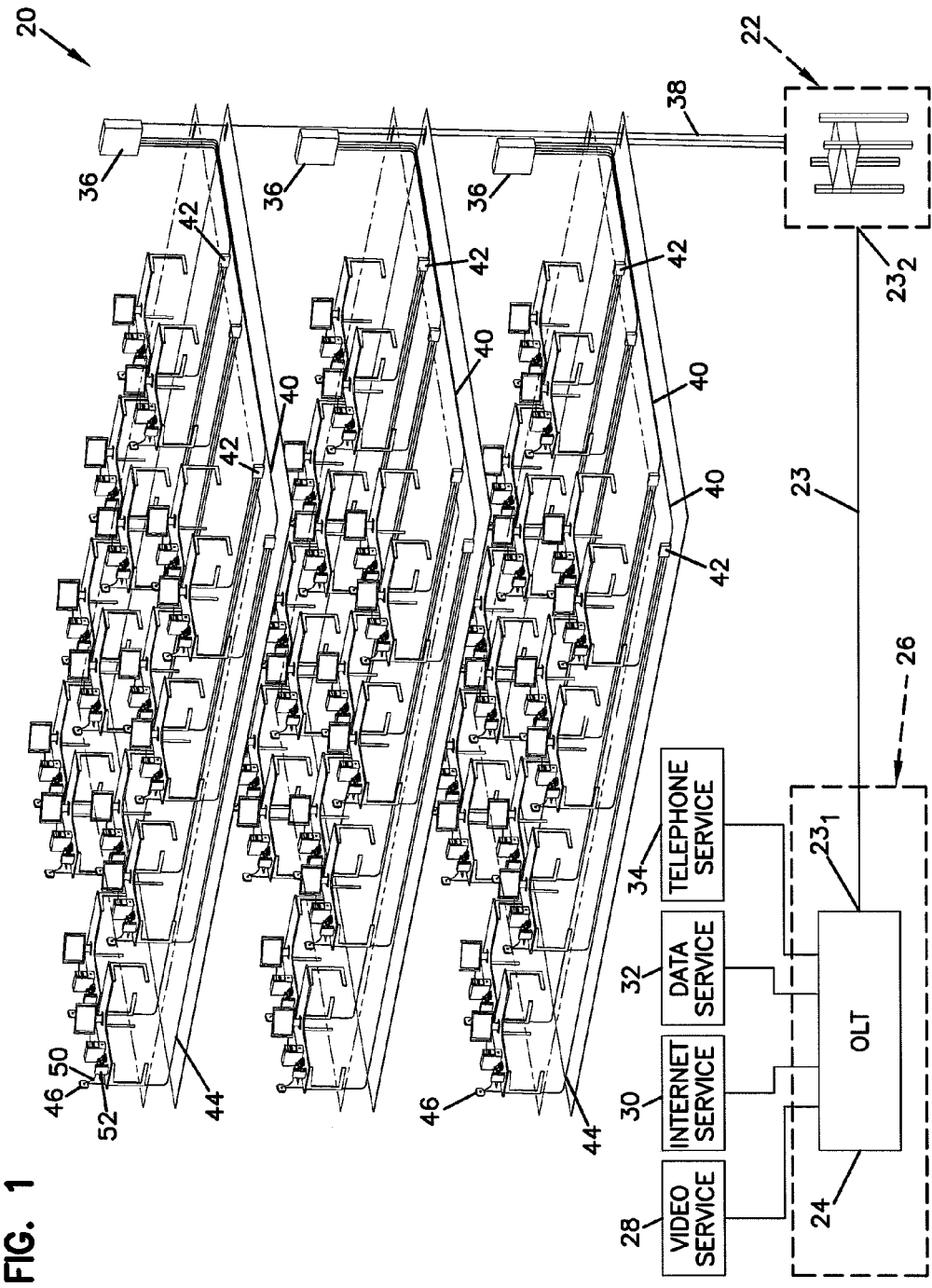
FIG. 1 shows a fiber optic network in accordance with the principles of the present disclosure.
Figure 1A:
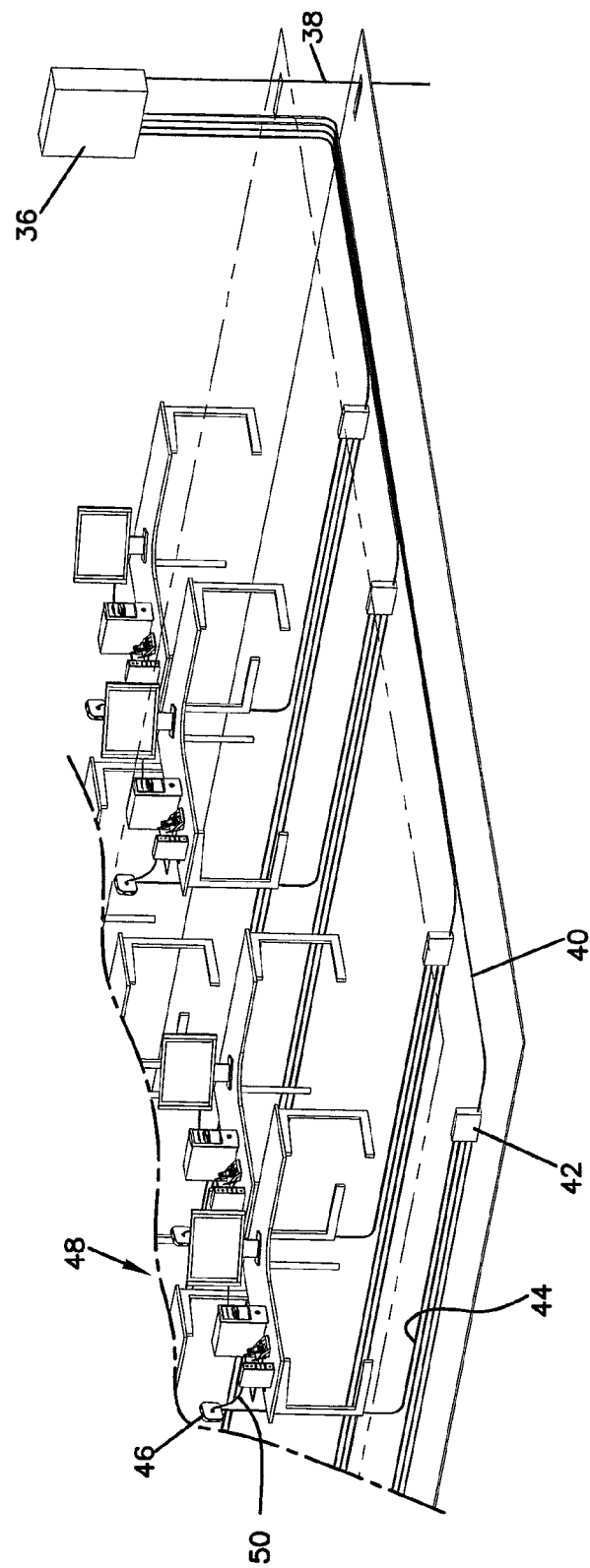
FIG. 1A is an enlarged view of a portion of the fiber optic network of FIG. 1.
Figure 2:
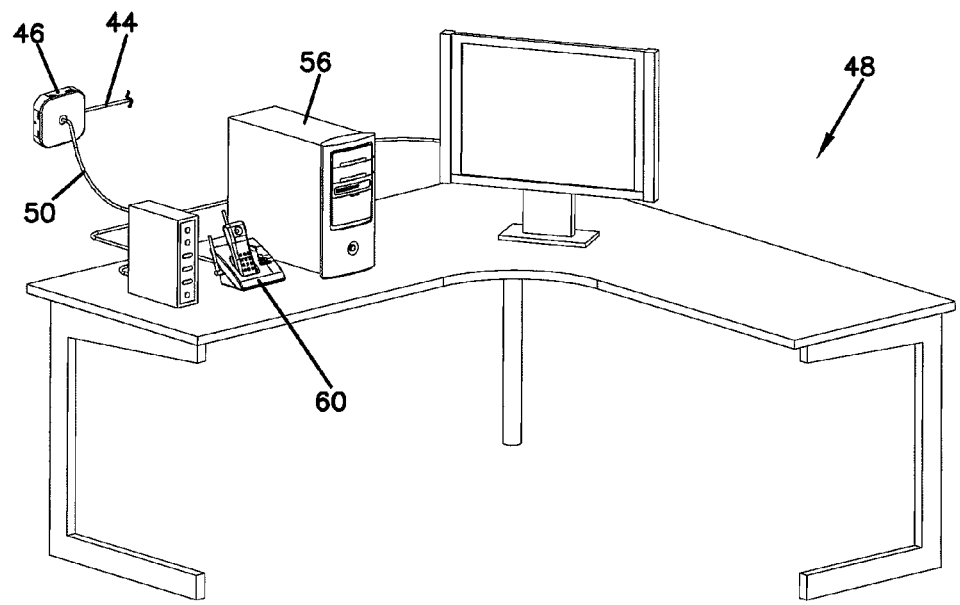
FIG. 2 is a perspective view of a work station of the fiber optic network of FIG. 1.
Figure 3:
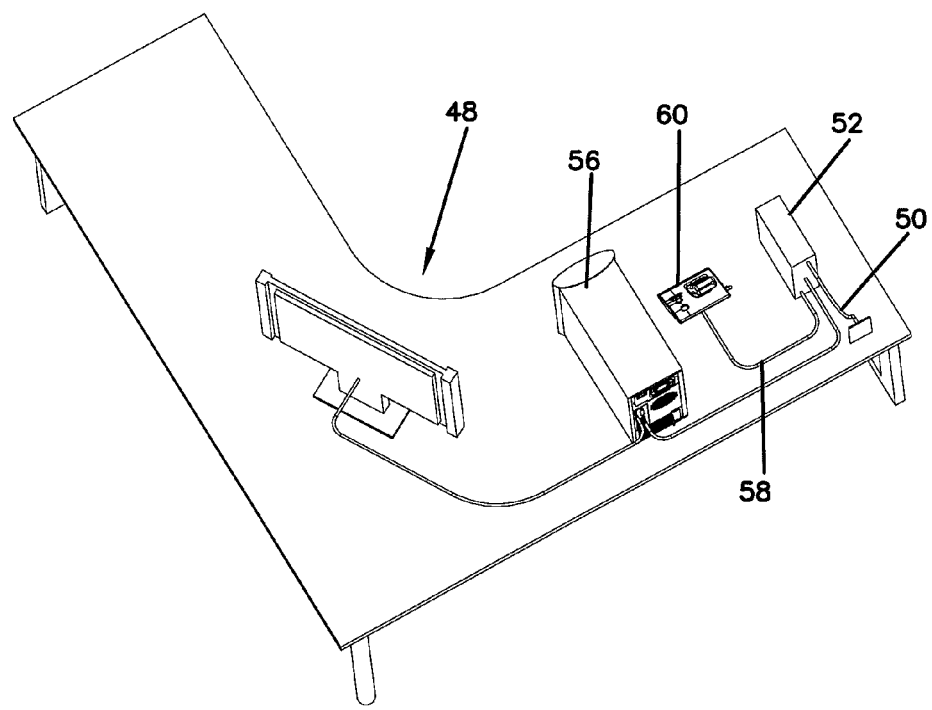
FIG. 3 is another view of the work station of the fiber optic network of FIG. 1.

FIGS. 1, 1A, 2 and 3 show an in-building passive optical network 20 in accordance with the principles of the present disclosure. The optical network 20 includes an in-building fiber management center 22 optically connected by a multi-fiber cable 23 (i.e., a cable having multiple optical fibers contained within a jacket) to an optical line terminal 24 (OLT) provided at a remote data center 26. The multi-fiber cable 23 has first and second opposite ends $23_1$, $23_2$. The optical line terminal 24 interfaces with different types of telecommunication services such as video services 28, internet services 30, data services 32 and telephone services 34. The optical network 20 also includes a plurality of fiber distribution hubs 36. The fiber distribution hubs 36 are shown on separate floors of a building and are shown optically connected to the in-building fiber management center 22 by multi-fiber cables 38. Multi-fiber cables 40 are routed from the fiber distribution hubs 36 to a plurality of fiber distribution terminals 42 provided at each floor of the building. Fiber optic cables 44 (i.e., cables each having at least one optical fiber within a jacket) are routed from each of the fiber distribution terminals 42 to wall boxes 46 provided adjacent desktop locations 48 or elsewhere. Fiber optic cables 50 are routed from the wall boxes 46 to desktop optical network terminals 52 (ONT) where optical signals carried through the optical network 20 are converted from optical to electrical signals. Computer cables 54 connect the desktop optical network terminals 52 to computers 56 located at the desktop locations 48, and phone cables 58 connect the desktop optical network terminals 52 to telephones 60 located at the desktop locations 48. The desktop optical network terminals 52 can also be connected to other components such as televisions. In embodiments where the desktop equipment (e.g., phone, computer, television, etc.) is directly compatible with fiber optic transmissions, the fiber optic cables 50 can be routed directly from the wall boxes 46 to the desktop equipment.

In the embodiment of FIG. 1, the optical line terminal 24 is shown located at a remote data center such as at a service provider central office or at an intermediate location between the central office and the building. It will be appreciated that in other embodiments, the optical line terminal 24 can be located at the in-building fiber management center 22 or elsewhere in the building. Additionally, the in-building fiber management center 22 can be in a data room or data closet. Alternatively, the in-building fiber management center 22 can constitute a telecommunications rack or frame within the building (e.g., in the basement), or a cabinet, wall box or other type of enclosure positioned within the building.

Certain aspects of the present disclosure relate to features for facilitating rapidly installing fiber-to-the-desktop networks. In certain embodiments, spools for rapidly deploying fiber optic cables can be incorporated into or on various housings, structures or other components of the system. For example, in certain embodiments, rapid deployment spools can be incorporated into components (e.g., drawers, panels, cabinets, etc.) at the in-building fiber management center 22, into the fiber distribution hubs 36, into the fiber distribution terminals 42 and into the wall boxes 46.

Figure 4:
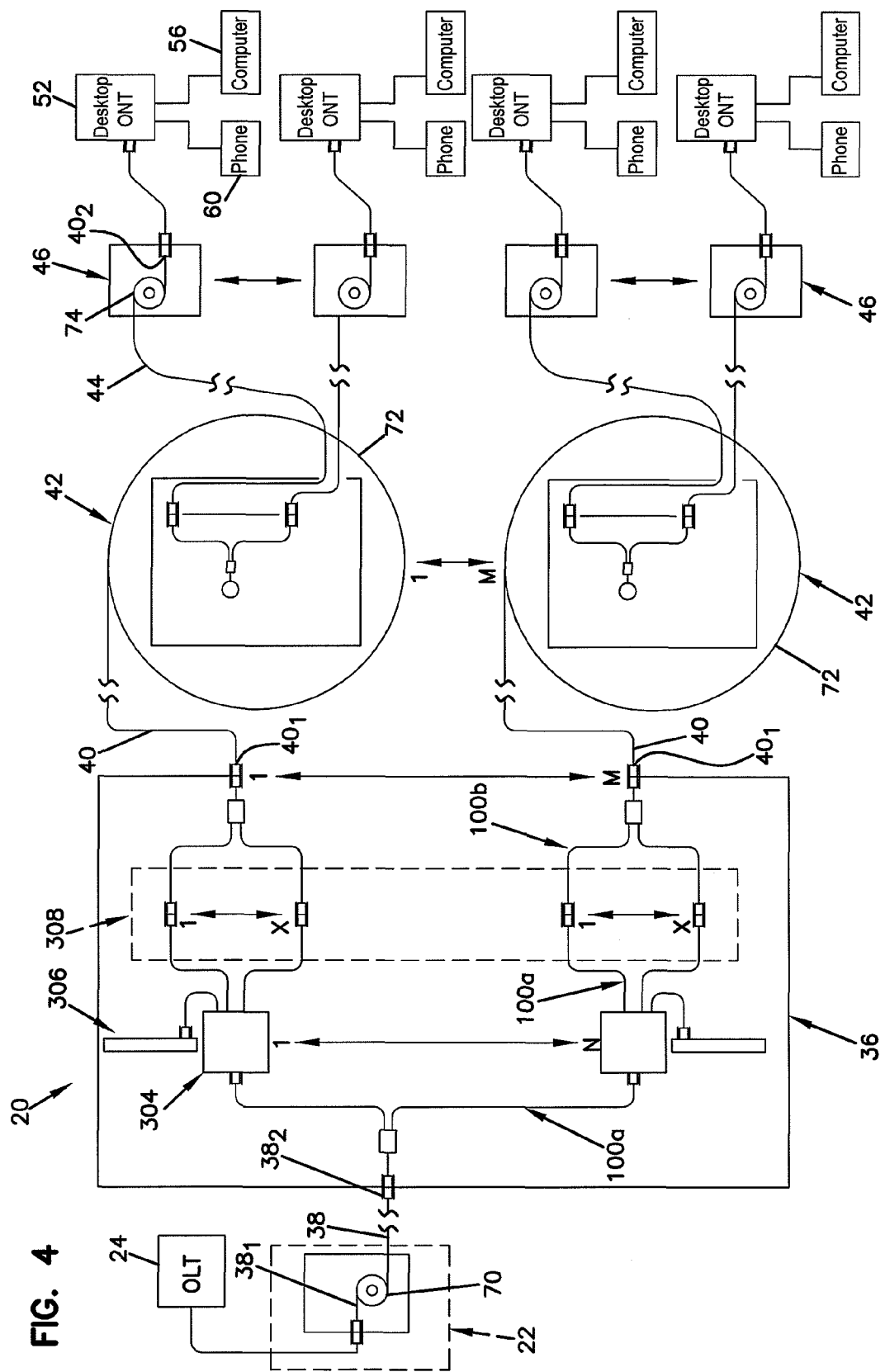
FIG. 4 schematically shows portions of the fiber optic network of FIG. 1.
Figure 4A:
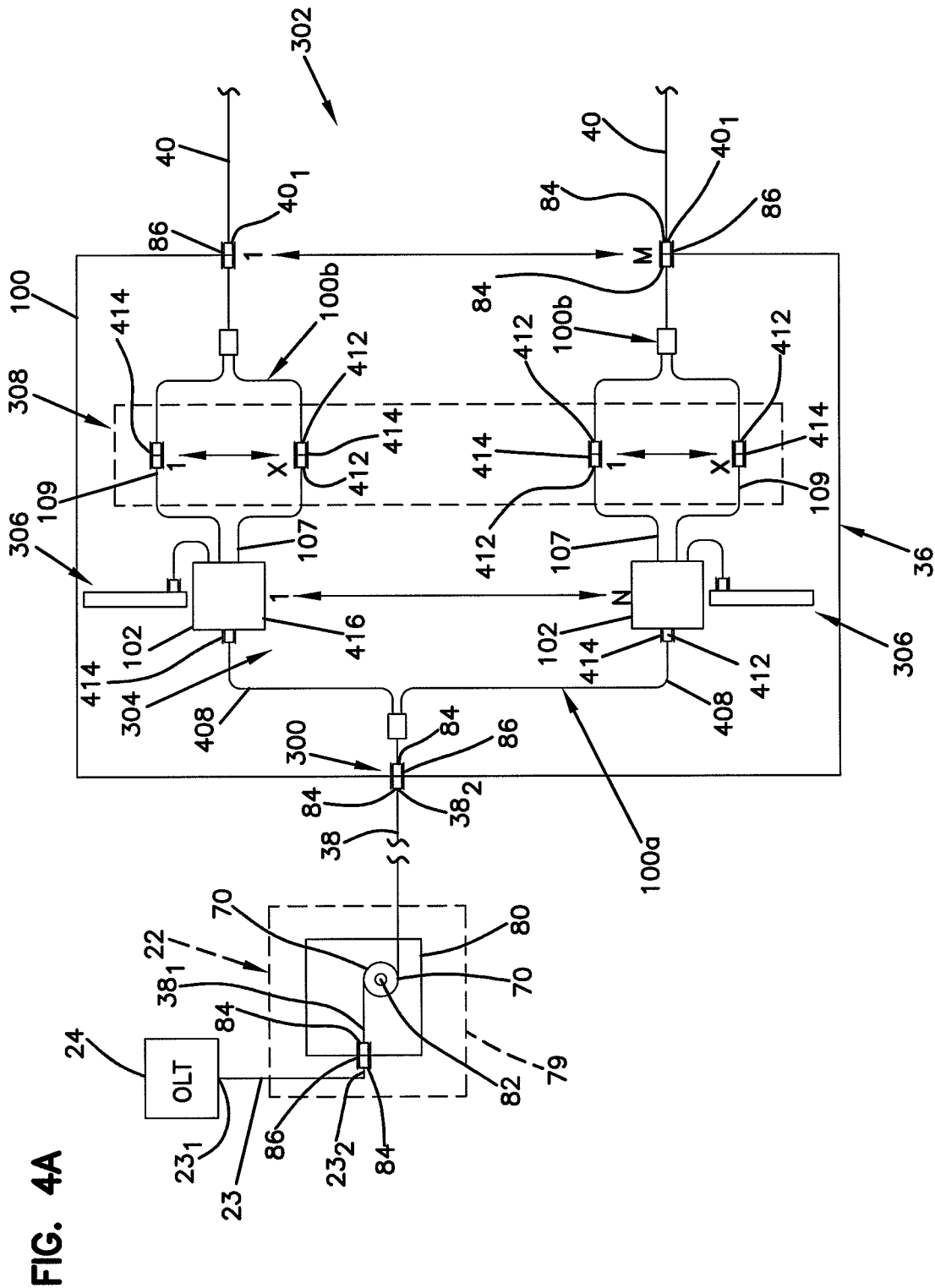
FIG. 4A is an enlarged view of a portion of the schematic diagram of FIG. 4.
Figure 4B:
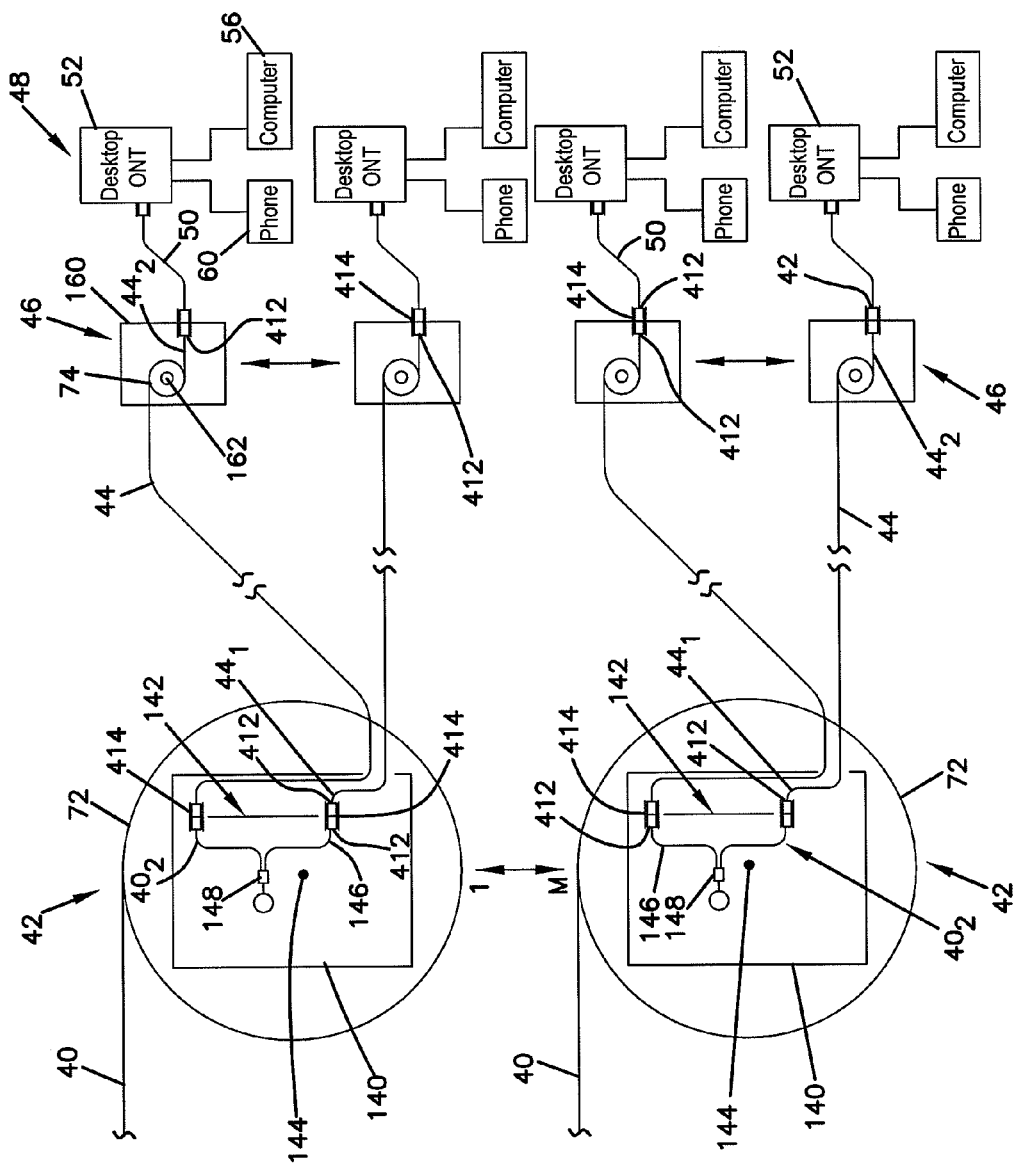
FIG. 4B is an enlarged view of another portion of the schematic diagram of FIG. 4.

FIGS. 4, 4A and 4B schematically show a portion of the in-building passive optical network 20 of FIG. 1 with deployment spools incorporated into various components of the network. For example, a deployment spool 70 depicted at the in-building fiber management center 22 for facilitating paying out one of the multi-fiber cables 38 during deployment of the cable 38 from the in-building fiber management center 22 to its corresponding fiber distribution hub 36. Also, the depicted fiber distribution terminals 42 are shown including deployment spools 72 for facilitating paying out the multi-fiber cables 40 during deployment of the multi-fiber cables 40 from the fiber distribution terminals 42 to the fiber distribution hubs 36. Moreover, the wall boxes 46 are depicted including deployment spools 74 for facilitating paying out the fiber optic cables 44 during deployment of the cables 44 from the wall boxes 46 to the fiber distribution terminals 42.

Referring to FIG. 4A, the in-building fiber management center 22 is shown including a telecommunications rack or frame 79 on which a piece of telecommunications equipment 80 (e.g., drawer, panel, module or other component) is mounted. The piece of telecommunications equipment 80 includes the spool 70. For example, the spool 70 can be rotatably mounted to a structural component of the piece of telecommunications equipment 80 by a structure such as a spindle and bearing arrangement. The spool 70 can be rotatably mounted on a structural component (e.g., a drawer framework) of the piece of equipment 80 such that the spool 70 can rotate about its central axis 82 relative to the structural component when the multi-fiber cable 38 wrapped about the spool 70 is paid off from the spool 70. The depicted multi-fiber cable 38 includes first and second ends $38_1$, $38_2$ at which multi-fiber connectors 84 (i.e., fiber optic connectors having ferrules that each support the end portions of a plurality of optical fibers) are mounted. The depicted piece of equipment 80 also includes multi-fiber connector adapter 86 (a fiber optic adapter adapted for coupling together two multi-fiber connectors, hereinafter referred to as an MFC adapter) mounted to the structural component. MFC adapter 86 of the equipment 80 functions to couple multi-fiber connector 84 mounted at the first end $38_1$ of the multi-fiber optic cable 38 to corresponding multi-fiber connector 84 mounted at the second end $23_2$ of the multi-fiber cable 23 routed from the piece of equipment 80 to the optical line terminal 24.

During installation of the optical network 20, multi-fiber connector 84 mounted at the second end $23_1$ of the multi-fiber cable 23 is inserted into a first end of MFC adapter 86 of the equipment 80. Multi-fiber connector 84 mounted at the first end $38_1$ of the fiber optic cable 38 is initially secured to a portion of the deployment spool 70 at a location where the first end $38_1$ of the fiber optic cable 38 does not interfere with paying out the second end $38_2$ of the cable 38 from the spool 70. To install the multi-fiber cable 38 between the in-building fiber management center 22 and the fiber distribution hub 36, the second end $38_2$ of the cable 38 is pulled toward the fiber distribution hub 36. As the second end $38_2$ is pulled, the spool 70 spins about its axis 82 relative to the structural component of the equipment 80 thereby allowing the fiber optic cable 38 to be paid off from (i.e., dispensed from) the spool 70. The installer continues to dispense the cable 38 from the spool 70 until a sufficient length of cable has been dispensed such that multi-fiber connector 84 at the second end $38_2$ of the cable 38 can be plugged into MFC adapter 86 located at a signal input location 300 of the fiber distribution hub 36. Multi-fiber connector 84 at the first end $38_1$ is then uncoupled/detached from the deployment spool 70 and plugged into a second end of MFC adapter 86 of the equipment 80 to provide an optical connection between the multi-fiber cable 23 and the multi-fiber cable 38. Examples of rack mounted drawers having integrated spool dispensing capabilities are disclosed in U.S. Patent Application Ser. No. 61/227,247 entitled "Rapid Universal Rack Mount Drawer", which is hereby incorporated by reference in its entirety.

FIGS. 5 and 6 illustrate an example configuration for first and second multi-fiber connectors $84_1$, $84_2$ that can be used in systems in accordance with the principles of the present disclosure. The depicted multi-fiber connectors $84_1$, $84_2$ each include a ferrule 90 in which the end portions of a plurality of optical fibers 92 are secured. The fibers 92 have end faces that are aligned along a line or lines defined across the length of the end surface of the ferrule 90. The fiber optic connectors $84_1$, $84_2$ can include alignment structures provided on the ferrule for aligning the end faces of the fibers secured in the ferrule of a first multi-fiber connector with the end faces of the optical fiber secured within the ferrule of a second multi-fiber connector. In certain embodiments, the alignment structures can include pins 85 provided on the multi-fiber connector $84_1$ that fit within corresponding receptacles (not shown) defined within the ferrule 90 of the multi-fiber connector $84_2$. The multi-fiber connectors $84_1$, $84_2$ also include release sleeves 94 mounted over main housings 96 that support the ferrules 90. The release sleeves 94 can be retracted relative to the main housings 96 to assist in releasing the multi-fiber connectors from a MFC adapter.

The MFC adapter 86 of FIGS. 5 and 6 is an example of the type of MFC adapter that can be used in systems in accordance with the principles of the present disclosure. The MFC adapter 86 includes an adapter body 200 defining a first end 201 positioned opposite from a second end 202. A passage extends longitudinally through the adapter body 200 between a first port 204 located at the first end 201 of the adapter body 200 and a second port 206 located at the second end 202 of the adapter body 200. Latches 208 or other retention structures are provided within the adapter body 200. When multi-fiber connectors 84$_1$, 84$_2$ are respectively inserted within the first and second ports 204, 206 of the adapter body 200, the ferrules 90 of the multi-fiber connectors 84$_1$, 84$_2$ abut one another with their respective fibers 92 in alignment with one another (e.g., via the pin and receptacle alignment structure described above), and the latches 208 provided within the adapter body 200 mechanically retain the multi-fiber connectors 84$_1$, 84$_2$ within the adapter body 200 such that the multi-fiber connectors 84$_1$, 84$_2$ are mechanically coupled together. By pulling back on the release sleeves 94, the multi-fiber connectors 84$_1$, 84$_2$ can be disengaged from the latches 208 of the adapter 86 and removed from their corresponding ports 204, 206 of the adapter body 200.

Referring again to FIGS. 4 and 4A, the depicted fiber distribution hub 36 includes a cabinet 100 including various regions for mounting optical components. For example, the cabinet 100 can include the signal input location 300, an output cable connection location 302, a splitter module mounting location 304, a connector storage location 306 and a termination region 308. One or more of MFC adapters 86 can be provided at the signal input location 300 and one or more MFC adapters 86 (e.g., 1-to-M MFC adapters) can also be provided at the output cable connection location 302. A fiber optic harness 100a can be used to provide an optical connection between the signal input location 300 and the splitter module mounting location 304 and a fiber optic harness 100b can be used to provide an optical connection between the termination region 308 and the signal output location 302. Splitter modules 102 (e.g., 1-to-N splitter modules) are provided at the splitter module mounting location 304 for optically splitting input signals carried to the splitter module mounting location 304 by the fiber optic harness 100a into a plurality of output signals. Fiber optic splitter pigtails 107 are used to carry the output signals from the splitter module mounting location 304 to the termination region 308. The fiber optic harness 100b then carries the output signals from the termination region 308 to the output cable connection location 302. Connectorized ends of at least some of the splitter pigtails 107 can be temporarily stored at the connector storage location 306 when the splitter pigtails 107 are not needed at the termination region 308 for providing service connections to customers. An example fiber distribution hub having features as described above is disclosed by U.S. patent application Ser. No. 12/241,576 entitled "Low Profile Fiber Distribution Hub", now U.S. Pat. No. 7,751,672, which is hereby incorporated by reference in its entirety.

Figure 7:
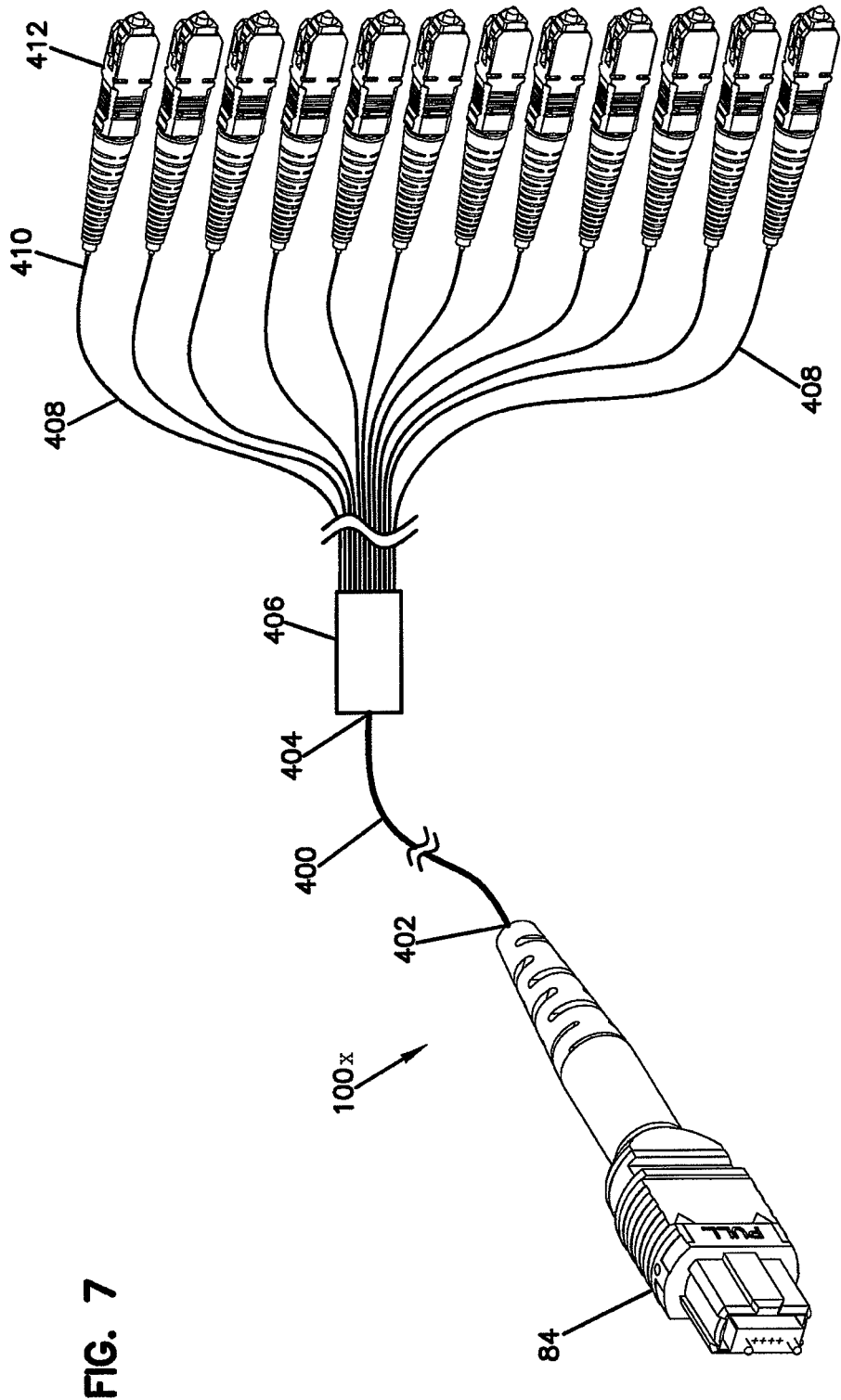
FIG. 7 shows a fiber optic harness that can be used in fiber optic networks in accordance with the principles of the present disclosure.

FIG. 7 shows a harness 100x having an example configuration that can be used for the harnesses 100a, 100b. The harness 100x includes a ribbon portion 400 including a plurality of ribbonized optical fibers. Multi-fiber connector 84 is mounted at a first end 402 of the ribbon portion 400 with the optical fibers of the ribbon portion 400 being terminated at the multi-fiber connector 84. A second end 404 of the ribbon portion 400 is located at a fan-out 406 where the optical fibers of the ribbon portion 400 are separated from one another into individual pigtails 408. Each of the pigtails 408 can include an optical fiber, a buffer layer (e.g., a 900 micron buffer layer) surrounding the fiber, an outer jacket (e.g., a 2 millimeter outer jacket) and a strength layer (e.g., a layer of aramid yarn) positioned between the outer jacket and the buffer layer. The pigtails 408 include free ends 410 at which single fiber connectors 412 (e.g., an SC connector or other connector including a ferrule supporting a single optical fiber) are mounted.

Referring back to FIG. 4A, the splitter mounting location 304 of the fiber distribution hub 36 includes a panel, shelf, housing or other structure for supporting from 1-to-N of the splitter modules 102. Referring to FIG. 4A, the splitter mounting location 304 includes from 1-to-N single fiber connector (SFC) adapters 414 for use in optically connecting the splitter modules 102 to the pigtails 408 of the harness 100a. The splitter modules 102 can include outer housings 416 that each enclose one or more optical splitters for optically splitting the input signals from the harness 100a into output signals that are outputted from the splitter module 102 via the splitter pigtails 107. The optical splitters can provide 1-to-X split ratios (e.g., 1-to-8; 1-to-16, 1-to-32). The splitter modules 102 can include single fiber connectors 412 mounted to the outer housings 416 for use in inputting the input signals from the harness 100a to the splitters 418 within the housings 416. The connectors 412 of the splitter modules 102 are coupled to the connectors 412 of the harness 100a by the SFC adapters 414 of the splitter mounting location 304. In this way, optical splitter modules 102 can have a plug-in-play configuration. An example plug-in-play splitter module configuration is disclosed at U.S. Pat. No. 7,418,181 entitled "Fiber Optic Splitter Module" that is hereby incorporated by reference in its entirety. Example configurations for single fiber connectors and SFC adapters are disclosed at U.S. Pat. No. 5,317,663, which is hereby incorporated by reference in its entirety.

The signal input location 300 of the fiber distribution hub 36 provides an interface location for optically interconnecting the optical harness 100a to the multi-fiber cable 38. For example, as shown at FIG. 4A, the MFC adapter 86 at the signal input location 300 mechanically couples the multi-fiber connector 84 positioned at the second end 38$_2$ of the multi-fiber cable 38 to the multi-fiber connector 84 of the optical harness 100a such that an optical connection exists between the cable 38 and the optical harness 100a.

The splitter pigtails 107 can each include an optical fiber, a buffer layer (e.g., a loose or tight 900 micron buffer layer) surrounding the fiber, an outer jacket (e.g., a 2 millimeter outer jacket) and a strength layer (e.g., a layer of aramid yarn) positioned between the outer jacket and the buffer layer. The splitter pigtails 107 include free ends 109 spaced-apart from the splitter module housings 416. Single fiber connectors 412 (e.g., SC connectors or other connectors including a ferrule supporting a single optical fiber) are mounted at the free ends 109 of the splitter pigtails 107.

The termination region 308 of the fiber distribution hub 36 includes a plurality of SFC adapters 414 mounted on an adapter support structure such as a panel or frame. The termination region 308 functions to mechanically and optically connect the connectors 412 at the free ends 109 of the splitter pigtails 107 to the connectors 412 of the optical harnesses 100b. The multi-fiber connectors 84 of the optical harnesses 100b plug into MFC adapters 86 located at the output cable connection location 302. The output cable connection location 302 of the fiber distribution hub 36 provides an interface location for optically interconnecting the optical harnesses 100b to the multi-fiber cables 40. For example, as shown at FIG. 4A, the MFC adapters 86 at the output cable connection location 302 mechanically couple multi-fiber connectors 84 positioned at first ends 40$_1$ of the multi-fiber cables 40 to the multi-fiber connectors 84 of the optical harnesses 100b such that optical connections exist between the cables 40 and the optical harnesses 100b. The multi-fiber cables 40 have second ends 40$_2$ that are routed into the fiber distribution terminals 42.

As shown at FIG. 4B, the fiber distribution terminals 42 of the optical network 20 each include an enclosure 140 in which a termination region 142 having a plurality of fiber optic SFC adapters 414 is housed. As shown in FIG. 4B, the deployment spools 72 are shown mounted to the exterior of the enclosure 140. However, in other embodiments, the deployment spools 72 may be housed within the enclosures 140. The deployment spools 72 are rotatable about rotation axes 144. When the deployment spools 72 are rotated about the rotation axes 144, the enclosures 140 and their corresponding termination regions 142 rotate in unison with the deployment spools 72 about the rotation axes 144. Example fiber distribution terminals are disclosed in U.S. patent application Ser. No. 12/113,786, filed May 1, 2008, now U.S. Pat. No. 7,715,679, U.S. patent application Ser. No. 12/182,705, filed Jul. 30, 2008, now U.S. Pat. No. 7,756,379, and U.S. patent application Ser. No. 12/199,923, filed Aug. 28, 2008, now U.S. Pat. No. 7,869,682, which are hereby incorporated by reference in their entireties.

As described above, the multi-fiber distribution cables 40 have first ends $40_1$ positioned opposite from second ends $40_2$. The first ends $40_1$ of the multi-fiber distribution cables 40 include multi-fiber connectors 84 that are inserted into the MFC adapters 86 provided at the output cable connection location 302 of the fiber distribution hub(s) 36 to provide optical connections therein between. The second ends $40_2$ of the multi-fiber fiber optic cables 40 extend into the enclosures 140 and are broken out (i.e., fanned out) into individual upjacketed fibers 146 at fanouts 148. Single fiber connectors 412 are mounted at the ends of the individual upjacketed fibers 146. The single fiber connectors 412 are inserted into ports of the SFC adapters 414 provided at the termination region 142.

Prior to installation, the multi-fiber cables 40 are wrapped around their corresponding deployment spools 72 to facilitate cable management during transport. The fiber distribution terminals 42 are moved to their desired mounting locations and mounted in place (e.g., to a wall or other structure). Thereafter, the first ends $40_1$ of the multi-fiber cables 40 are pulled away from the mounted fiber distribution terminals 42 thereby causing the enclosures 140 of the fiber distribution terminals 42 and their corresponding spools 72 to rotate about the rotation axes 144 as the multi-fiber cables 40 are paid off from the spools 72. The first ends $40_1$ of the multi-fiber cables 40 are pulled until they reach their corresponding fiber distribution hubs 36 and are plugged into corresponding MFC adapters 86 at the output cable connection locations 302 of the fiber distribution hubs 36. Since the termination regions 142 rotate in unison with the deployment spools 72 during deployment of the multi-fiber cables 40, the single fiber connectors 412 at the second ends $40_2$ of the multi-fiber distribution cables 40 can be plugged into the SFC adapters 414 of the termination region 142 as the cables 40 are paid off from the spools 72 during the installation process.

In other embodiments, the first ends $40_1$ of the multi-fiber cables 40 are initially inserted into the MFC adapters 86 at the output cable connection locations 302 of the fiber distribution hubs 36 with the fiber distribution terminals 42 in close proximity to the fiber distribution hubs 36. After the first ends $40_1$ of the multi-fiber cables 40 have been inserted into the MFC adapters 86 of the fiber distribution hubs 36, the installer moves the fiber distribution terminals 42 away from the fiber distribution hubs 36. As the installer moves the fiber distribution terminals 42 away from the fiber distribution hubs 36, the deployment spools 72 spin thereby allowing the multi-fiber cables 40 to be paid off from the spools 72. This process continues until the installer reaches the desired mounting location for the fiber distribution terminals 42, at which time the fiber distribution terminals 42 are mounted at the desired mounting locations.

The wall boxes 46 of the optical network 20 each include an enclosure 160 to which one or more SFC adapters 414 are mounted. The deployment spools 74 are mounted on or in the enclosures 160. In certain embodiments, the deployment spools 74 are rotatable relative to the enclosures 160 about rotation axes 162 to allow the fiber optic cables 44 to be dispensed or paid off from the spools 74. In other embodiments, the enclosures 160 and the spools 74 rotate in unison about the rotation axes 162 to allow the fiber optic cables 44 to be paid off from the spools 74. Example wall boxes are disclosed in U.S. patent application Ser. No. 12/472,905, filed May 27, 2009, now U.S. Patent Application Publication No. 2009/0294016, that is hereby incorporated by reference in its entirety.

The fiber optic cables 44 include first ends $44_1$ that are connectorized with single fiber connectors 412 and second ends $44_2$ that are also connectorized with single fiber connectors 412. The single fiber connectors 412 at the first ends $44_1$ of the cables 44 are plugged into the termination regions 142 of the fiber distribution terminals 42 to optically connect the fiber optic cables 44 to the multi-fiber cables 40. The single fiber fiber optic connectors 412 provided at the second ends $44_2$ of the fiber optic cables 44 are plugged into the SFC adapters 414 provided at the enclosures 160 of the wall boxes 46. The patch cords 50 are plugged into the SFC adapters 414 of the wall boxes 46 and are also plugged into the desktop optical network terminals 52 to provide an optical connection between the fiber optic cables 44 and the desktop optical network terminals 52.

During installation, the wall boxes 46 can initially be mounted to walls adjacent to the desktop locations 48. Thereafter, the first ends $44_1$ of the fiber optic cables 44 can be pulled outwardly from the wall boxes 46 causing the deployment spools 74 to rotate about the rotation axes 162. In the case where the deployment spools 74 rotate relative to the enclosure 160, the single fiber connectors 412 at the second ends $44_2$ of the fiber optic cables 44 can be disconnected from the SFC adapters 414 of the wall boxes 46 during deployment of the fiber optic cables 44, and can be inserted into the SFC adapters 414 of the wall boxes 46 after deployment of the fiber optic cables 44. The fiber optic cables 44 are pulled away from the wall boxes 46 until sufficient length has been paid out to allow the single fiber connectors 412 at the first ends $44_1$ of the fiber optic cables 44 to be plugged into the SFC adapters 414 at the termination regions 142 of the fiber distribution terminals 42.

In other embodiments, the first ends $44_1$ of the fiber optic cables 44 are plugged into the SFC adapters 414 of the termination regions 142 at the fiber distribution terminals 42 while the wall boxes 46 are in close proximity to the fiber distribution terminals 42. The installer then moves the wall boxes 46 away from the fiber distribution terminals 42. As the installer moves the wall boxes 46 away from the fiber distribution terminals 42, the deployment spools 72 spin about their respective rotation axes 162 to allow the fiber optic cables 44 to be paid off from the deployment spools 74. This process continues until the installer reaches the desktop locations 48 where the wall boxes 46 are to be mounted.

Figure 8:
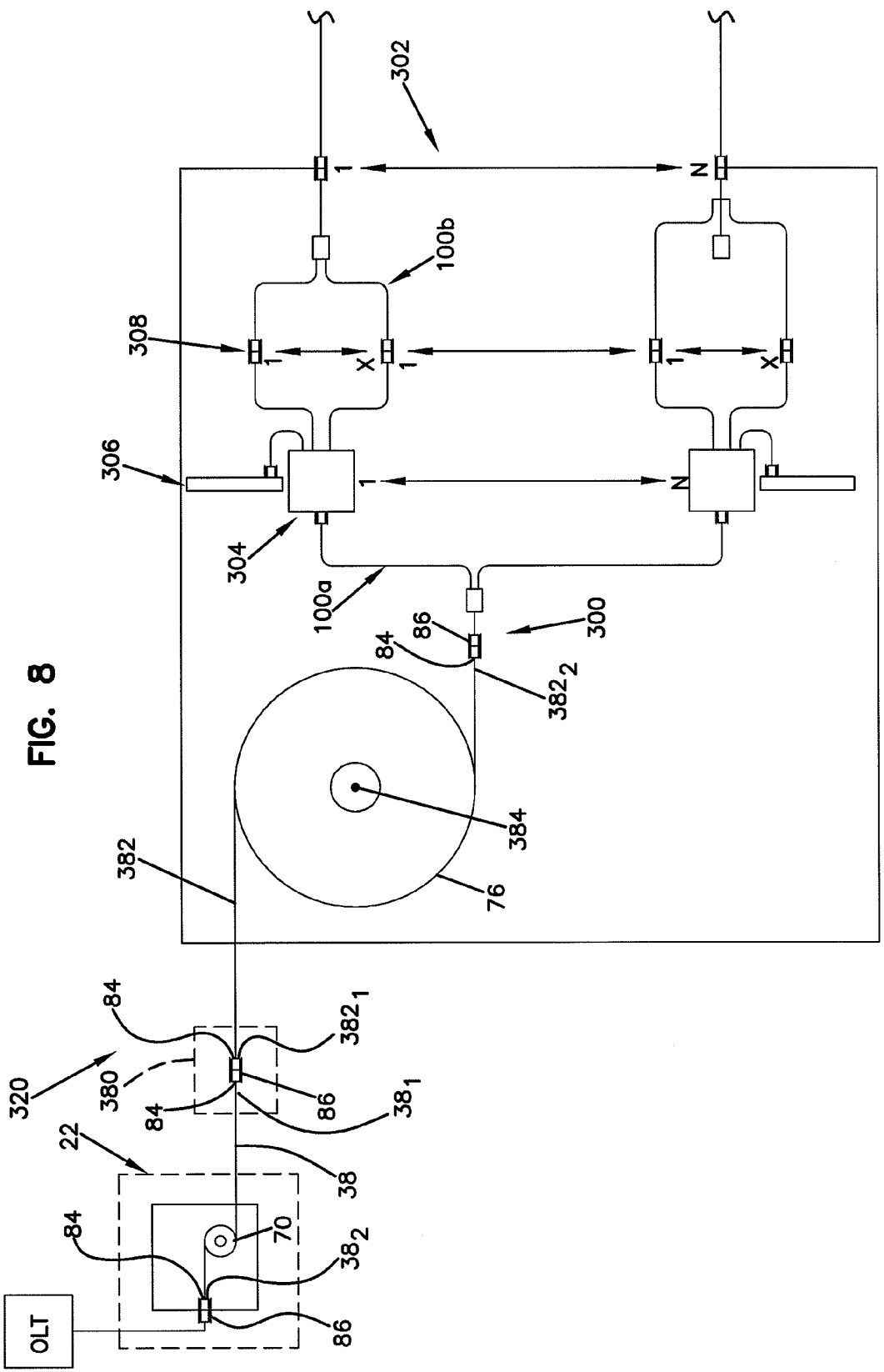
FIG. 8 shows an alternative arrangement for the portion of the fiber optic network depicted at FIG. 4.

FIG. 8 shows an alternative in-building passive optical network 320 that is similar to the passive optical network 20 of FIG. 4 except an intermediate junction box 380 has been provided between the in-building fiber management center 22 and the fiber distribution hub 36, and a deployment spool 76 has been provided at the fiber distribution hub 36. The intermediate junction box 380 includes an MFC adapter 86 that receives the multi-fiber connector 84 mounted at the second end $38_2$ of the multi-fiber cable 38 routed from the in-building fiber management center 22. An example fiber distribution hub including a deployment spool is disclosed at U.S. Provisional Patent Application Ser. No. 61/245,082, filed Sep. 23, 2009, which is hereby incorporated by reference in its entirety.

A multi-fiber cable 382 is wrapped about the deployment spool 76. The multi-fiber cable 382 includes first and second ends $382_1$, $382_2$ at which multi-fiber connectors 84 are mounted. The multi-fiber connector 84 at the first end $382_1$ of the multi-fiber cable 382 is plugged into the MFC adapter 86 located at the intermediate junction box 380 such that the multi-fiber cable 382 is optically connected to the multi-fiber cable 38 routed from the in-building cable management center 22 to the junction box 380. The second end $382_2$ of the multi-fiber cable 382 is plugged into the MFC adapter 86 positioned at the signal input location 300 of the fiber distribution hub such that the multi-fiber cable 382 is optically connected to the fiber harness 100a of the fiber distribution hub 36.

It is preferred for the deployment spool 76 to be rotatably mounted relative to the cabinet 100 of the fiber distribution hub 36. In certain embodiments, the deployment spool 76 can be mounted inside or outside the cabinet 100. The deployment spool 76 preferably rotates about a central axis 384 relative to the cabinet 100 as the multi-fiber cable 382 is paid off from the spool 76. During installation, the multi-fiber connector 84 at the second end $382_2$ of the multi-fiber cable 382 is initially attached to the spool 76 such that the second end $382_2$ is carried by the spool 76 as the second end $382_2$ of the cable 382 is paid off from the spool. For example, by pulling on the first end $382_1$ of the multi-fiber cable 382, the spool 76 spins about its axis 384 until a sufficient length of the cable 382 has been paid off to allow the multi-fiber connector 84 at the first end $382_1$ of the cable 382 to be plugged into the MFC adapter 86 at the junction box 380. Thereafter, the first end $382_1$ of the cable 382 is detached from the spool 76 and plugged into the MFC adapter 86 located at the signal input location 300 of the fiber distribution hub 36. In alternative embodiments, the first end $382_1$ of the cable 382 can be routed all the way to the in-building fiber management center 22 and the first end $382_1$ can be plugged into the MFC adapter 86 of the piece of equipment 80 such that the multi-fiber cable 382 is optically connected to the multi-fiber cable 23 routed from the OLT to the in-building fiber management center 22. In this way, the multi-fiber cable 382 eliminates the need for the junction box 380 and the multi-fiber cable 38.

Figure 9:
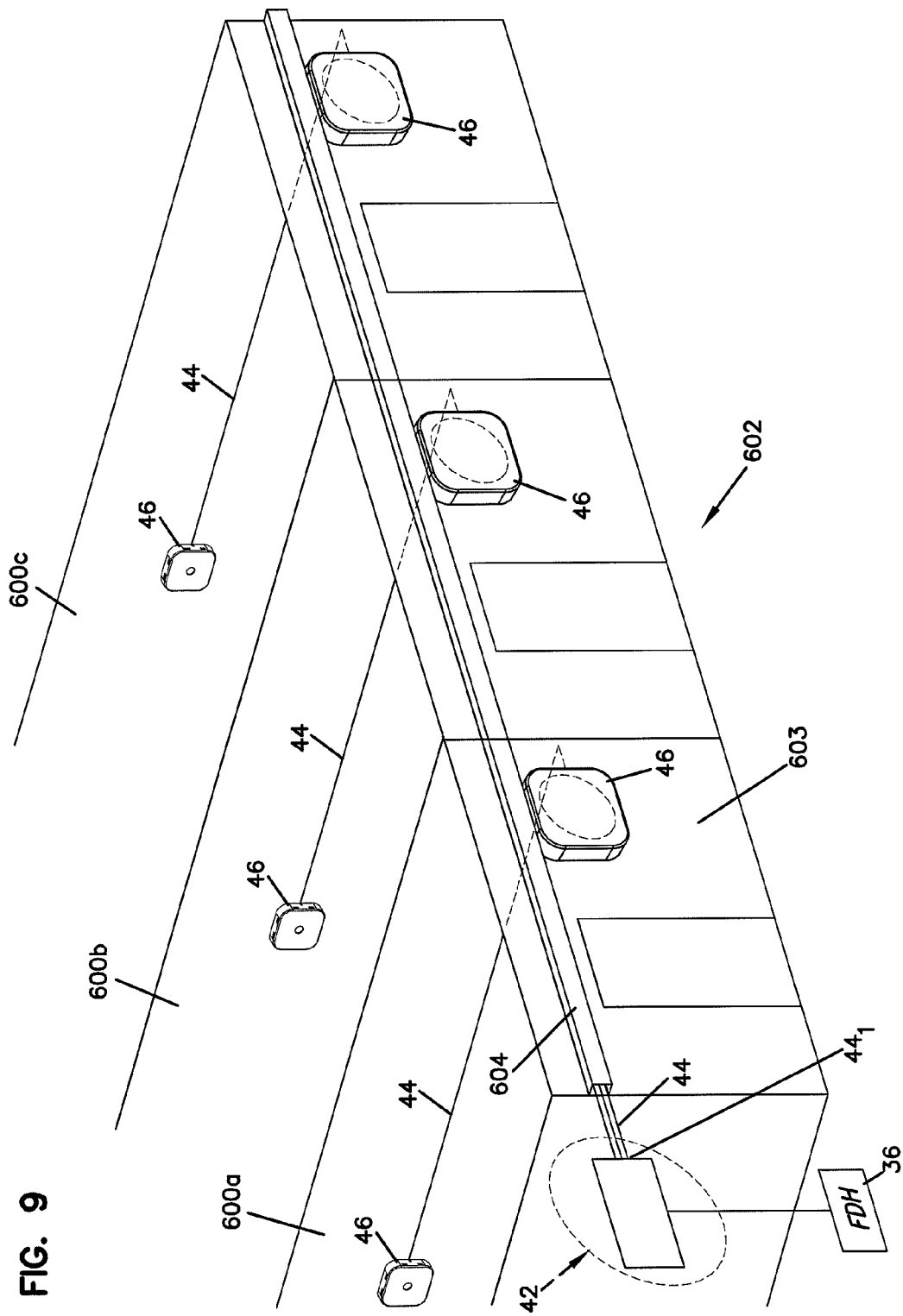
FIG. 9 shows another arrangement for a fiber optic network in accordance with the principles of the present disclosure.

FIG. 9 illustrates another configuration for incorporating an optical network into a building. The configuration uses many of the same components described above and such components have been assigned the same reference numbers. Referring to FIG. 9, the depicted building includes a plurality of separate subscriber locations 600a, 600b and 600c (e.g., apartments, offices, rooms, etc.). The subscriber locations 600a-600c are spaced along a hallway 602 of the building. The depicted portion of the network includes a fiber distribution terminal 42 as described above, which is preferably optically connected to a fiber distribution hub 36. The fiber distribution terminal 42 interfaces with a plurality of wall boxes 46 spaced apart along the length of the hall 602. As shown in FIG. 9, the wall boxes 46 are mounted to a wall 603 of the hallway 602 at locations adjacent to doorways of the subscriber locations 600a-600c. The fiber optic cables 44 corresponding to the wall boxes 46 are routed from the wall boxes 46 to the fiber distribution terminal 42 through a track 604 that extends along the hallway 602. First ends $44_1$ of the cables 44 are plugged into the termination region 142 of the fiber distribution terminal 42. Second ends $44_2$ of the cables 44 are plugged into the SFC adapters 414 of the wall boxes 46. Additional wall boxes 46 are provided within each of the subscriber locations 600a-600c. For example, the wall boxes 46 can be provided at desktop locations or elsewhere within the subscriber locations 600a-600c. Cables 44 of the wall boxes 46 within the subscriber locations 600a-600c are routed to their corresponding wall boxes 46 located within the hallway 602. For example, the cables 44 can be paid off from the spools 74 of the wall boxes 46 within the subscriber locations 600a-600c and routed through the hallway wall 603 to reach the corresponding wall boxes 46 within the hallway 602. Similar to the previous embodiments, the wall boxes 46 within the subscriber locations 600a-600c provide optical ports (e.g., adapter ports) for facilitating interconnecting with an ONT (e.g., a desktop ONT) or directly with a fiber optic compatible piece of equipment (e.g., a computer or phone with an optics card).

To install the portion of the network disclosed in FIG. 9, the hallway wall boxes 46 can initially be installed along the length of the hallway 602. The fiber optic cables 44 of the wall boxes 46 within the hallway 602 can then be routed through the track 604 to the fiber distribution terminal 42. The fiber optic cables 44 are routed through the track 604 by pulling the first ends $44_1$ of the cables 44 through the track 604 such that as the first ends $44_1$ are pulled, the cables 44 are paid off from the spools 74 within the wall boxes 46. Thereafter, the wall boxes 46 can be mounted within the subscriber locations 600a-600c, and the cables 44 can be paid off from the spools 74 of the wall boxes 46 and routed to the corresponding wall boxes 46 in the hallway 602. The cables 44 of the wall boxes 46 within the subscriber locations 600a-600c are optically connected to the cables 44 of the wall boxes 46 in the hallway 602 by the SFC adapters 414 located within the wall boxes 46 mounted within the hallway 602.

Figure 10:
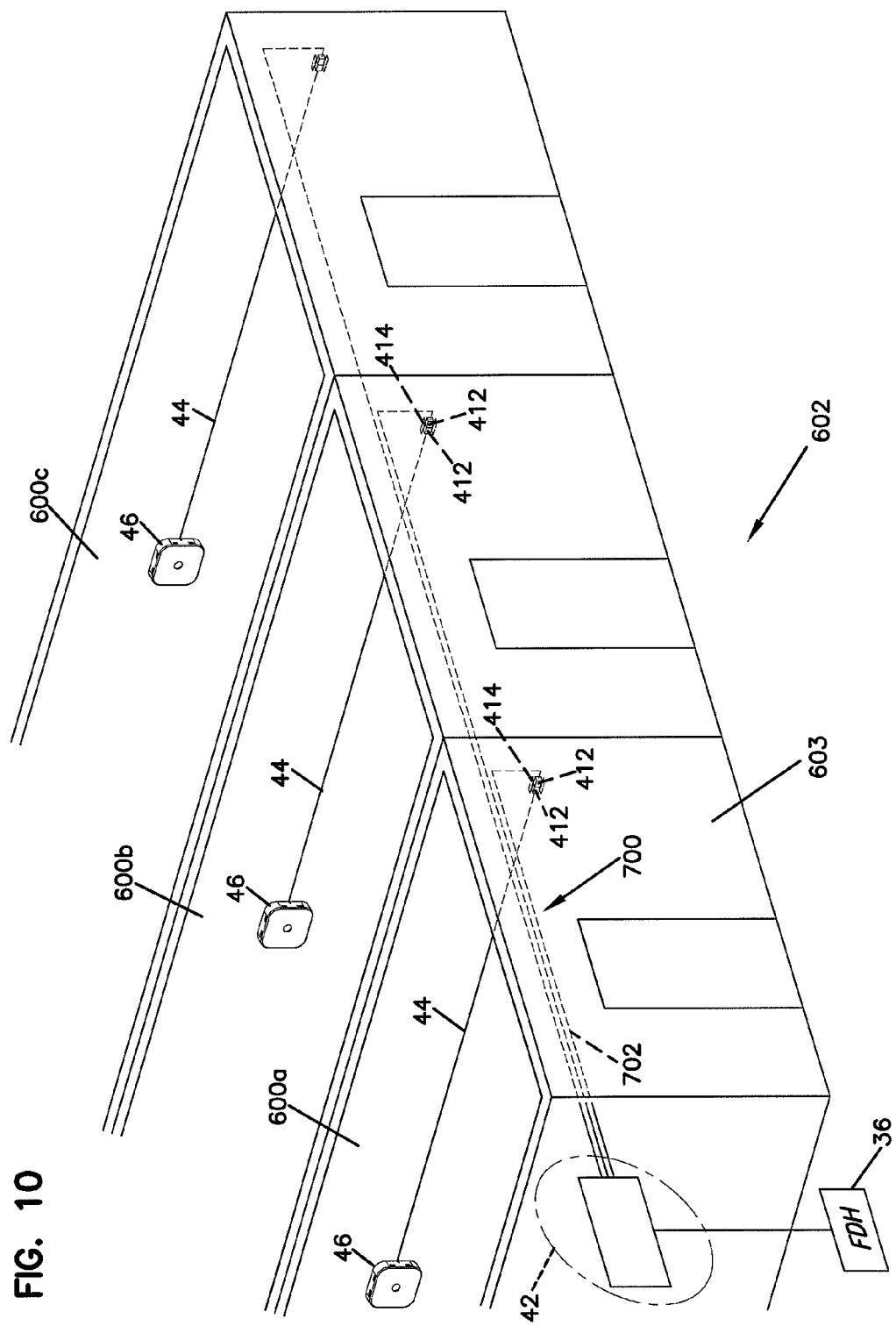
FIG. 10 shows still another configuration for a fiber optic network in accordance with the principles of the present disclosure.

FIG. 10 shows an alternative configuration for an in-building passive optical network in accordance with the principles of the present disclosure. In the configuration of FIG. 10, a bundle drop 700 is routed from the fiber distribution terminal 42 through the wall 603 defining the hallway 602. The bundle drop 700 includes a plurality of optical fibers 702 optically connected to the termination region 142 of the distribution terminal 42. The optical fibers 702 are broken out at each of the subscriber locations 600a-600c and are each connectorized with a single fiber connector 412. The single fiber connectors 412 can be inserted within SFC adapters 414 mounted within the wall 603 of the hallway 602. Wall boxes 46 are mounted within the subscriber locations 600a-600c and cables 44 are routed from the wall boxes 46 to the SFC adapters 414 within the wall 603. In this way, optical connections are made between the cables 44 and the fibers 702 of the bundle drop 700. The cables 44 are routed from the wall boxes 46 by pulling on the cables such that the internal spools 74 of the wall boxes 46 spin thereby allowing the cables 44 to be paid out from the wall boxes 46 and routed to the adapters 414 within the hallway wall 603.

What is claimed is:

1. A fiber optic network comprising:
   a fiber distribution hub including a cabinet, an optical splitter within the cabinet, a hub termination region within the cabinet, a signal input location and an output cable connection location;
   a fiber distribution terminal including a terminal housing and a terminal termination region, the fiber distribution terminal also including a terminal spool;

a first fiber optic cable wrapped around the terminal spool, the first fiber optic cable interconnecting the fiber distribution terminal to the output cable connection location of the fiber distribution hub, the terminal spool rotating about a first axis to allow the first fiber optic cable to be dispensed from the terminal spool;

a wall box including a wall box enclosure, a fiber optic adapter positioned at the wall box enclosure and a wall box spool; and a second fiber optic cable wrapped around the wall box spool, the second fiber optic cable interconnecting the wall box to the fiber distribution terminal, the wall box spool rotating about a second axis to allow the second fiber optic cable to be dispensed from the wall box spool.

2. The fiber optic network of claim 1, wherein the first fiber optic cable is a multi-fiber optic cable.

3. The fiber optic network of claim 2, wherein the second fiber optic cable is a single fiber optic cable.

4. The fiber optic network of claim 2, wherein the first fiber optic cable includes a first end at which a multi-fiber connector is mounted, wherein the multi-fiber connector is received within a fiber optic adapter at the output cable connection location of the fiber distribution hub, and wherein a second end of the first fiber optic cable is fanned-out into a plurality of separate optical fibers to which single-fiber connectors are mounted.

5. The fiber optic network of claim 1, wherein the terminal spool is mounted outside the terminal housing and wherein the terminal housing and the terminal spool rotate in unison about the first axis when the first fiber optic cable is dispensed from the terminal spool.

6. The fiber optic network of claim 5, wherein the wall box spool is mounted inside the wall box enclosure and wherein the wall box spool rotates relative to the wall box enclosure when the second fiber optic cable is dispensed from the wall box spool.

7. The fiber optic network of claim 1, further comprising an in-building fiber management center including a piece of optical equipment, wherein a third fiber optic cable interconnects the piece of optical equipment to the signal input location of the fiber distribution hub, and wherein the third fiber optic cable includes a multi-fiber cable.

8. The fiber optic network of claim 7, wherein the piece of optical equipment includes a fiber management center spool on which the third fiber optic cable is wound, the fiber management center spool being rotatable relative to a structural component of the piece of optical equipment to allow the third fiber optic cable to be dispensed from the piece of optical equipment.

9. The fiber optic network of claim 7, wherein the fiber distribution hub includes a hub spool on which the third fiber optic cable is wound, the hub spool being rotatable relative to the cabinet of the fiber distribution hub to allow the third fiber optic cable to be dispensed from the fiber distribution hub.

10. The fiber optic network of claim 1, further comprising a junction box and an in-building fiber management center including a piece of optical equipment, the fiber optic network also including a third fiber optic cable routed from the signal input location of the fiber distribution hub to the junction box to a fourth fiber optic cable routed from the junction box to the piece of optical equipment at the in-building fiber management center.

11. The fiber optic network of claim 10, wherein the fiber distribution hub includes a rotatable hub spool about which the third fiber optic cable is wrapped, and wherein the piece of optical equipment includes a rotatable fiber management center spool about which the fourth fiber optic cable is wrapped.

12. The fiber optic network of claim 1, further comprising a third fiber optic cable routed from the fiber optic adapter of the wall box to an optical network terminal.

13. The fiber optic network of claim 12, wherein the optical network terminal is a desktop optical network terminal.

14. A fiber optic network comprising:
a fiber distribution hub including a cabinet, an optical splitter within the cabinet, a hub termination region within the cabinet, a signal input location and an output cable connection location;

a fiber distribution terminal including a terminal housing and a terminal termination region, the fiber distribution terminal also including a terminal spool;

a first fiber optic cable wrapped around the terminal spool, the first fiber optic cable interconnecting the fiber distribution terminal to the output cable connection location of the fiber distribution hub, the terminal spool rotating about a first axis to allow the first fiber optic cable to be dispensed from the terminal spool;

a first wall box including a first wall box enclosure, a first fiber optic adapter positioned at the first wall box enclosure and a first wall box spool;

a second fiber optic cable wrapped around the first wall box spool, the second fiber optic cable interconnecting the first wall box to the fiber distribution terminal, the first wall box spool rotating about a second axis to allow the second fiber optic cable to be dispensed from the first wall box spool; a second wall box including a second wall box enclosure, a second fiber optic adapter positioned at the second wall box enclosure and a second wall box spool; and a third fiber optic cable wrapped around the second wall box spool, the third fiber optic cable interconnecting the second wall box to the first wall box, the second wall box spool rotating about a third axis to allow the third fiber optic cable to be dispensed from the second wall box spool.

15. A fiber optic network comprising:
a fiber distribution hub including a cabinet, an optical splitter within the cabinet, a hub termination region within the cabinet, a signal input location and an output cable connection location;

a fiber distribution terminal including a terminal housing and a terminal termination region, the fiber distribution terminal also including a terminal spool;

a first fiber optic cable wrapped around the terminal spool, the first fiber optic cable interconnecting the fiber distribution terminal to the output cable connection location of the fiber distribution hub, the terminal spool rotating about a first axis to allow the first fiber optic cable to be dispensed from the terminal spool;

a bundle drop optically connected to the first fiber optic cable at the fiber distribution terminal;

a wall box including a wall box enclosure, a fiber optic adapter positioned at the wall box enclosure and a wall box spool; and a second fiber optic cable wrapped around the wall box spool, the second fiber optic cable interconnecting the wall box to an optical fiber of the bundle drop, the wall box spool rotating about a second axis to allow the second fiber optic cable to be dispensed from the wall box spool.

* * * * *